United States Patent [19]

Stokes

[11] Patent Number: 4,803,851
[45] Date of Patent: Feb. 14, 1989

[54] FOOD FREEZING APPARATUS

[75] Inventor: Malcolm L. Stokes, Surrey, England

[73] Assignee: The BOC Group plc, Surrey, England

[21] Appl. No.: 47,378

[22] Filed: May 7, 1987

[30] Foreign Application Priority Data

May 12, 1986 [GB] United Kingdom ............... 8611539

[51] Int. Cl.⁴ .......................................... F25D 17/02
[52] U.S. Cl. ...................................... 62/374; 62/380
[58] Field of Search .................... 62/63, 374, 375, 380

[56] References Cited

U.S. PATENT DOCUMENTS

| | | | |
|---|---|---|---|
| 3,287,932 | 11/1966 | Schlemmer, Jr. | 62/374 |
| 3,376,710 | 4/1968 | Hirtensteiner | 62/374 |
| 3,403,527 | 10/1968 | Berreth et al. | 62/374 |
| 3,455,120 | 7/1969 | Schlemmer | 62/380 |
| 3,553,973 | 1/1971 | Moran | 62/63 |
| 3,580,000 | 5/1971 | Wagner | 62/380 |
| 3,813,895 | 6/1974 | Klee et al. | 62/374 |
| 3,841,109 | 10/1974 | Cann | 62/380 |
| 3,881,322 | 5/1975 | Le Diouron | 62/63 |
| 4,004,870 | 1/1977 | Guttinger et al. | 62/374 |
| 4,171,625 | 10/1979 | Morgan et al. | 62/380 |
| 4,276,753 | 7/1981 | Sandberg et al. | 62/186 |
| 4,580,413 | 4/1986 | Klee | 62/380 |

FOREIGN PATENT DOCUMENTS 6912134 4/1940 Fed. Rep. of Germany .
1536626 7/1968 France .
1494104 12/1977 United Kingdom .

OTHER PUBLICATIONS

Banket-Chocolade-Suikerwerken, vol. 34, No. 6, Jun. 1966, pp. 281–282: "Kreuter" Dubbele-Stralingskoel Tunnel Crystal O. Mat.

Primary Examiner—Ronald C. Capossela
Attorney, Agent, or Firm—David A. Draegert; Larry R. Cassett

[57] ABSTRACT

A food freezing tunnel has an inner trough member and a roof member. In order to gain access to the interior of the tunnel, for example for purposes of cleaning the tunnel, the inner trough member is able to be raised and lowered. The tunnel has a spray header for liquid nitrogen and fans for circulating resulting cold nitrogen vapor. The tunnel has an inner trough member spaced from the outer trough member. The inner trough member has a floor extending underneath the upper run of a conveyor passing through the tunnel and has sides which prevent direct impingement of liquid nitrogen onto the outer trough member and which co-operate with the roof member to inhibit the passage of cold gas from within the trough member over the sides.

13 Claims, 7 Drawing Sheets

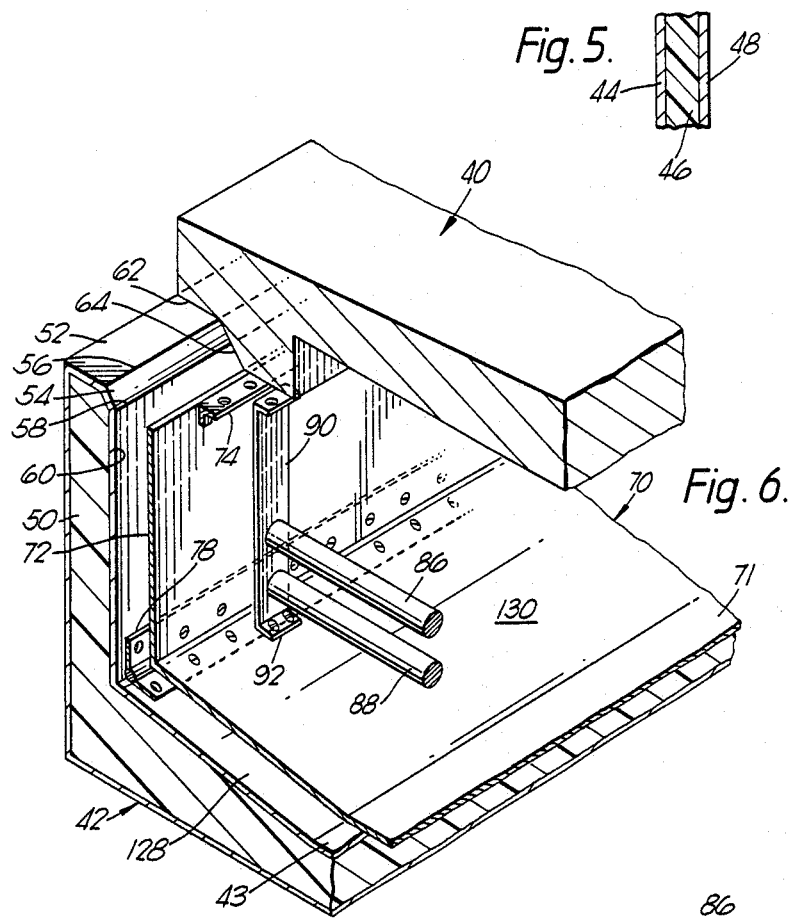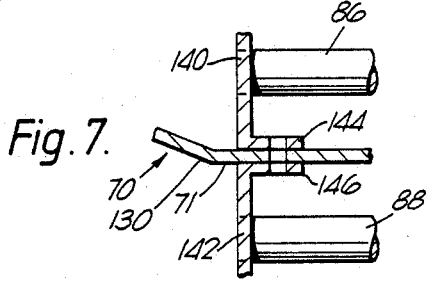

FOOD FREEZING APPARATUS

BACKGROUND OF THE INVENTION

This invention relates to apparatus suitable for freezing food.

Nowadays, liquid nitrogen and, to a lesser extent, liquid carbon dioxide, are widely used to freeze food. A common method of employing the liquid nitrogen or liquid carbon dioxide to freeze food is to advance the food to be frozen on a convenyor through a tunnel into which the liquefied gas is sprayed. Heat exchange takes place between the liquefied gas and the food and also between the food and the cold gas formed as a result of the vaporisation of the liquid. Fans are typically employed to promote the heat exchange between the cold gas and the food. Food freezing tunnels are, for example, described in U.K. Pat. specification No. 2 076 952 B and U.S. Pat. No. 4,171,625.

Typically, conventional food freezing tunnels may be from 20 to 60 feet long and from two to four feet wide. In order to achieve good utilisation of the refrigerative capacity of the liquid nitrogen or liquid carbon dioxide, it is necessary to ensure that the tunnel carcass is thermally-insulated. Although the most effective insulation for use at cryogenic temperatures is vacuum-insulation, it has not proven economically feasible to employ vacuum-insulation in food freezing tunnels. Accordingly it is conventional to employ an insulating material such as foamed polyurethane in the carcass of a freezing tunnel, and, typically the walls of the tunnel are made from inner and outer spaced stainless steel skins with the space therebetween packed with suitable termally-insulating material such as foamed polyurethane. Notwithstanding the presence of this thermal insulation, there is still typically an appreciable inleak of heat into the tunnel directly through the walls thereof. Such in leak of heat, we have found, tends to be enhanced by a number of phenomena. First, the spray header or other means of injecting the liquid nitrogen or liquid carbon dioxide into the tunnel may spray liquefied gas directly at the side walls of the tunnel in the event that the spray header is badly designed or the tunnel is particularly narrow. Second, it is inevitable that the fans employed in the tunnel will direct some flow of cold gas in the direction of the side walls of the tunnel carcass. Third, the liquid nitrogen sometimes passes through the conveyor belt and can collect on the floor of the tunnel itself. Fourth, direct inpingement of liquid nitrogen or its cold vapour on elastomeric seals employed to seal access openings to the tunnel can cause failure of the seal. Moreover in the kind of freezing tunnel in which the roof of the tunnel may be moved out of engagement with the rest of the tunnel housing, or vice versa, elastomeric seals between the two sections of the tunnel may become so cold that a considerable quantity of atmospheric moisture freezes on its outer surfaces with the result that the tunnel sections become stuck together and considerable force needs to be applied to separate them again.

It is an aim of the present invention to provide an improved tunnel which ameliorates the above-mentioned problems by inhibiting contact between the liquefied gas or its cold vapour and the sides of the tunnel.

SUMMARY OF THE INVENTION

According to the present invention there is provided apparatus suitable for freezing food, comprising a tunnel defined by an outer trough member and a roof; a conveyor extending through the tunnel from its entrance to its exit and having an upper run and a lower run; means for introducing liquefied gas into the tunnel; means for creating in the tunnel turbulence in cold gas formed as a result of vaporisation of the liquefied gas; and an inner trough member spaced from the outer trough, having a floor extending underneath the upper run of the conveyor and having sides which prevent direct impingement of liquefied gas onto the outer trough and which cooperate with said roof member to inhibit the passage of cold gas from within said inner trough member over said sides.

In one embodiment of an apparatus according to the invention the said sides engage the roof or complementary projections therefrom. For example, the roof member may have a pair of downward projections or lugs, each of which engages one face of a resilient stainless steel sealing member, another face of said sealing member being engaged by the inner trough member, whereby a fluid-tight seal is formed between the inner trough member and the roof member. It is to be appreciated, however, that it is not essential to the invention for there to be such seals, but if there is a small but steady flow of gas over the sides of the inner trough, the inner trough will be less effective. In another embodiment of apparatus according to the invention, there is no direct contact between the roof and outer trough members, but rather engagement through the inner trough member and longitudinal sealing members depending internally of the tunnel from the roof member, said outer trough member being adapted to bias the sides of the inner trough into contact with the respective sealing members.

The invention is particularly applicable to the kind of freezing tunnel in which the outer trough member is separable from the roof member, and particularly to the examples of such kind of tunnel in which the outer trough member is vertically reciprocable between an upper position in which it engages the roof member and a lower position in which access is able to be gained to the interior of the tunnel through the sides thereof.

Preferably, in such a tunnel in accordance with the invention, the outer trough member makes an engagement with the roof member at a level above the upper conveyor run. The use of the inner trough makes it possible to do without any elastomeric sealing member at this position between the outer trough member and the roof member.

In order to facilitate cleaning of the tunnel after its use, the sides of the inner trough are preferably hinged so that they may be lowered when the outer trough is in its lower position. In practice, however, it is generally necessary to employ a support frame for the tunnel of a kind having legs which extend upwards to the level of the roof member. Such legs would obstruct the sides of the inner trough member in the event that they were each made as a one-piece constructions. Accordingly, the sides of the inner trough member are preferably made of several separately hinged parts.

In order to be particularly effective in lengthening the path that the cold nitrogen or other gas has to take to flow from the region in the tunnel into which the liquefied gas is sprayed or otherwise introduced to the space between the inner and outer troughs, the inner trough preferably extends from a region at or near the entrance to the tunnel to a region at or near the exit from the tunnel. In the event that the floor of the inner trough is located underneath the lower run of the endless conveyor, the caternary of the belt may limit the extent of the lower trough. We therefore prefer that the floor of the inner trough should extend between the upper and lower belt runs.

BRIEF DESCRIPTION OF THE DRAWINGS

Apparatus according to the invention will now be described, by way of example, with reference to the accompanying drawings, in which:

FIG. 5 is a schematic section through the line V—V in FIG. 2;

FIG. 6 is a cut-away, schematic, perspective view of part of the tunnel shown in FIGS. 1 to 5, illustrating the support means for the tunnel conveyor and tunnel sleeve.

FIG. 7 is a schematic sectional elevation of a detail of an alternative embodiment of tunnel to that shown in FIGS. 1 to 6.

The drawings are not to scale.

DETAILED DESCRIPTION

Figure 1:
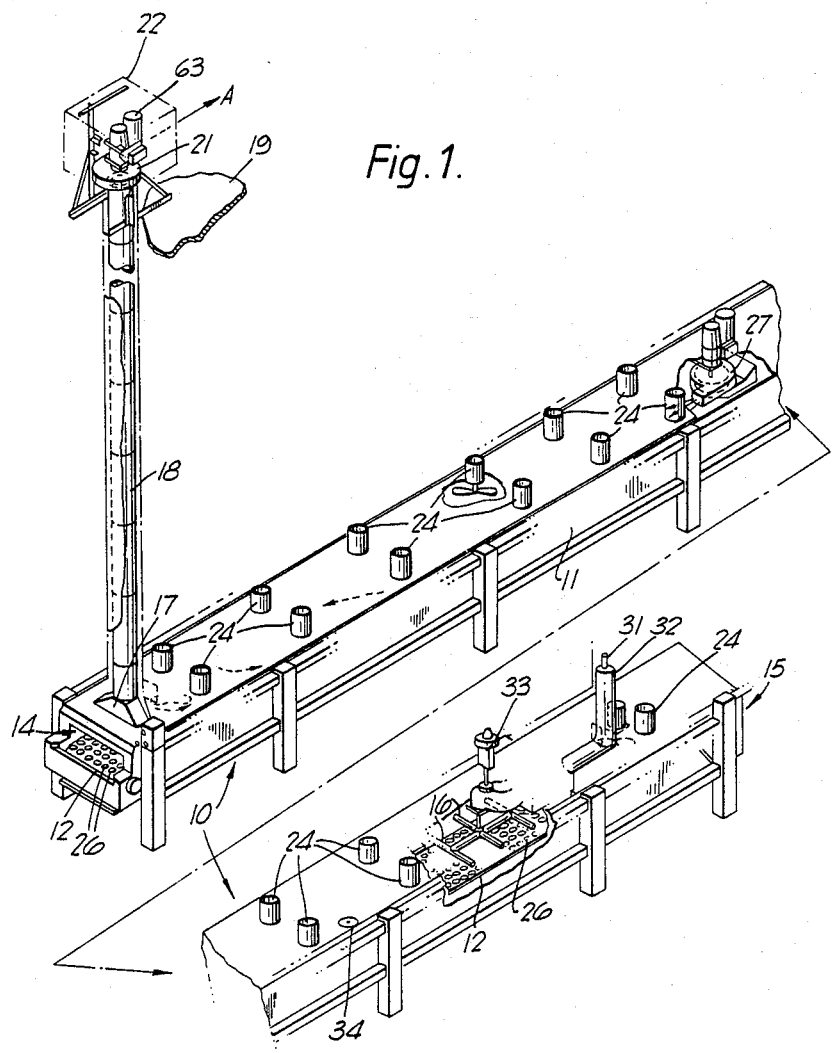
FIG. 1 is a perspective view, partially cut away, and schematic, of a freezing tunnel according to the invention.

Referring to FIG. 1 of the drawings, there is illustrated a food product freezing tunnel 10 including an elongate tunnel housing 11 through which a food product conveyor 12 extends from a food product entrance end 14 to an exit end 15. Within the tunnel housing 11, a liquid nitrogen spray header 16 or other suitable liquid nitrogen introduction means is provided for introducing liquid nitrogen into the tunnel 10. The spray header 16 is located near the tunnel exit 15. Although the ensuing description refers to the use of liquid nitrogen in the tunnel to provide the necessary cooling to freeze the food products, it is to be appreciated that liquid carbon dioxide may be used for this purpose instead of liquid nitrogen.

At entrance end 14 of the tunnel 10, an exhaust plenum 17 is connected to an exhaust stack 18 that extends up through the roof 19 of the building in which the tunnel is located. An exhaust blower 21 is mounted at the top of the stack 18. In the illustrated construction, there is a rain-proof housing 22 over the top of the stack 18. In operation, the blower 21 exhausts to the atmosphere in the direction of arrow A nitrogen in the tunnel 10.

The tunnel 10 further includes a plurality of turbulence fans 24 arranged in two rows along the length of the tunnel. The fans 24 are employed if desired in conjunction with a series of associated baffles (not shown), though if desired the baffles (not shown) may be omitted, to create turbulence in the nitrogen vapour formed by evaporation of the liquid nitrogen sprayed into the tunnel, and thus to facilitate cooling of food product 26 as the food product is conveyed through the tunnel by the conveyor 12. The food product 26 may comprise hamburger patties, steaks, chicken pieces, vegetable patties, or other food products that are able successfully to be frozen. At an intermediate location within the tunnel, preferably about midway between the spray header 16 and the exhaust plenum 17, there is a variable speed directional blower 27. The blower 27 effectively controls the proportionate flow of nitrogen vapour or gas towards the entrance and exit ends of the tunnel. Thus, increasing the speed of blower 27 increases the flow of gas toward the food product entrance 14, which is also the gas exhaust end of the tunnel 10. A liquid nitrogen supply (not shown) is connected to the tunnel 10 through a liquid nitrogen supply pipe 31 provided with a thermally-insulating jacket 32. The liquid nitrogen supply pipe 31 is also provided with a pneumatically actuated regulating valve 33 to control the flow of liquid nitrogen into the tunnel 10 through the spray header 16. A temperature sensor 34 is positioned in the tunnel housing 11, preferably at a location intermediate the spray header 16 and directional blower 27, and is connected to a control system (not shown) that controls the rate of introduction of liquid nitrogen into the tunnel 10 by controlling the operation of the valve 33.

As thus far described the tunnel 10 is generally conventional; it is similar to the food product freezing tunnel described in detail in U.S. Pat. No. 4,171,625. The food product 26 is deposited on conveyor 12 at the entrance end 14 of the tunnel housing 11. As the food product advances into the tunnel 10, it is progressively chilled by cold nitrogen gas that is brought into contact with it by operation of the circulation fans 24 and baffles. Thus, by the time food product reaches the spray header 16, it is already quite cold and may be starting to freeze at its surface. At the spray header 16, the food product is subjected to an intense spray of liquid nitrogen and freezing is completed quite rapidly. Shortly thereafter the frozen food product 26 is discharged from the exit end 15 of the tunnel 10.

During operation, and still in accordance with conventional practice, the speed of directional blower 27 may be varied to accommodate changing conditions within the tunnel, such as a variation in the rate of product flow. This has most often been accomplished by sensing the rate of flow of liquid nitrogen into the tunnel and adjusting the blower speed as a direct function of the liquid nitrogen flow rate.

It is to be appreciated that there are many different arrangements of fans and blowers that may be employed to obtain good heat transfer from the food product to the gas in the tunnel and hence to achieve efficient utilisation of the liquid nitrogen.

Novel features of the tunnel according to the invention will now be described with reference to FIGS. 2 to 8 of the drawings.

Figure 2:
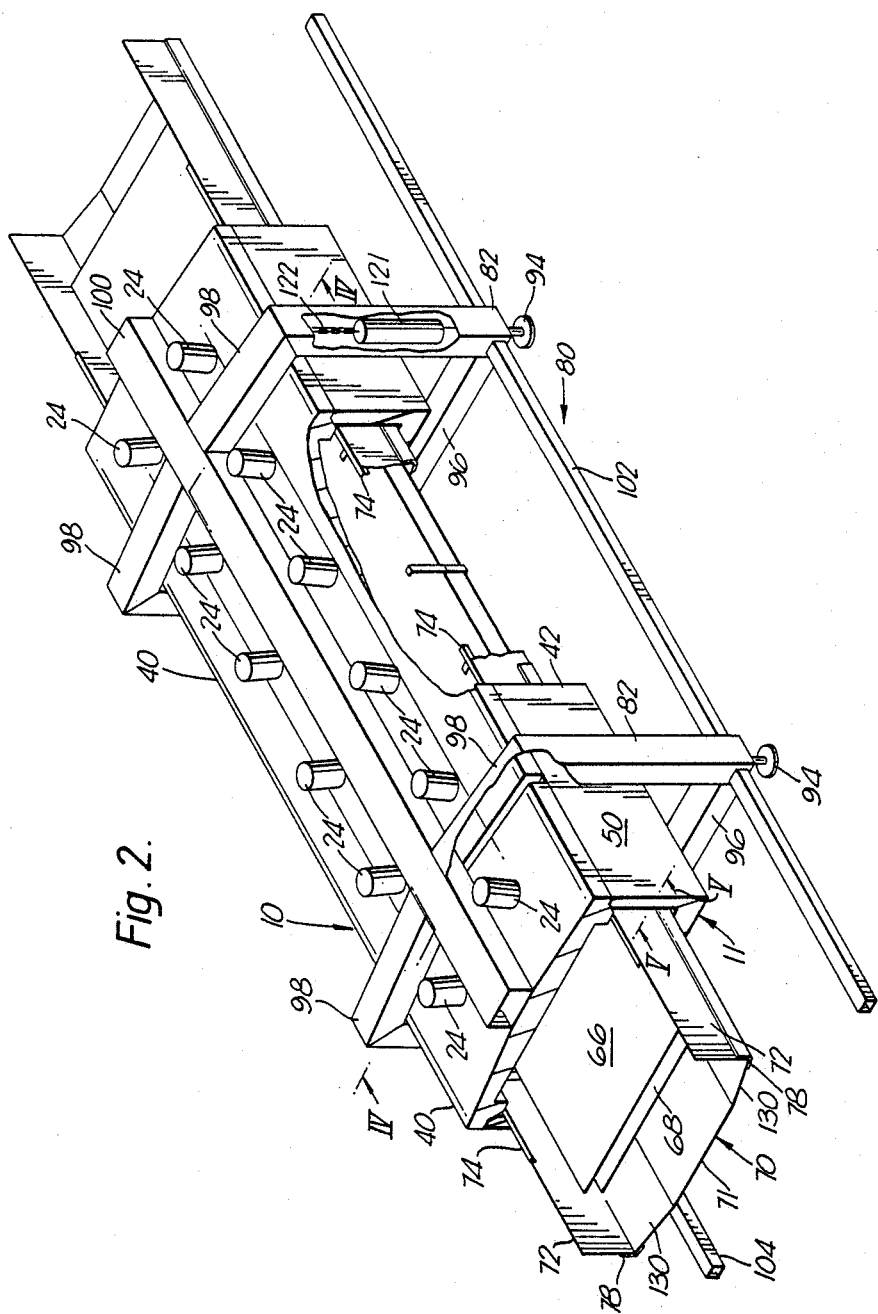
FIG. 2 is a schematic perspective view, partly cut away, of a central length of the tunnel shown in FIG. 1.
Figure 3:
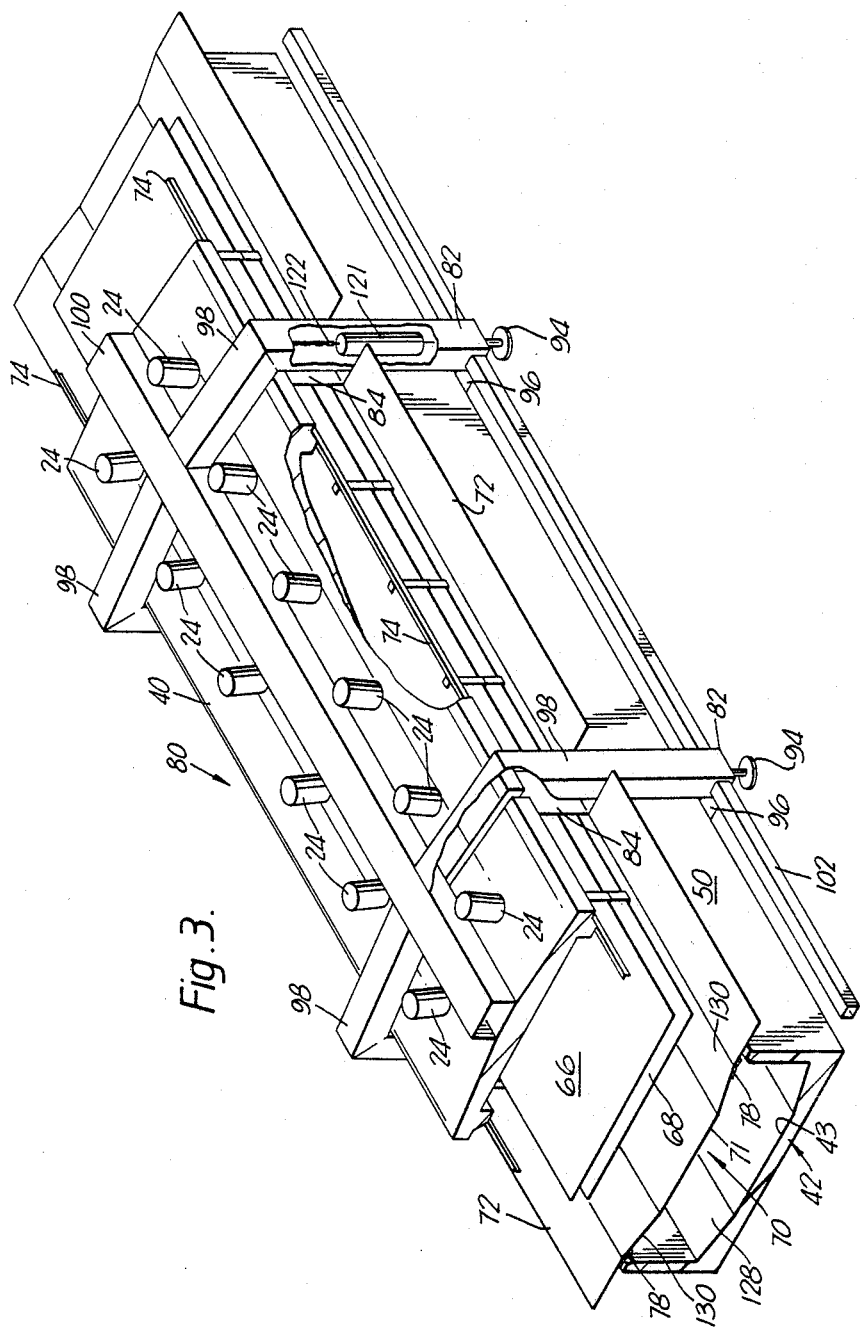
FIG. 3 is a schematic perspective view similar to that of FIG. 2, but with the trough of the tunnel in its lower position.
Figure 4:
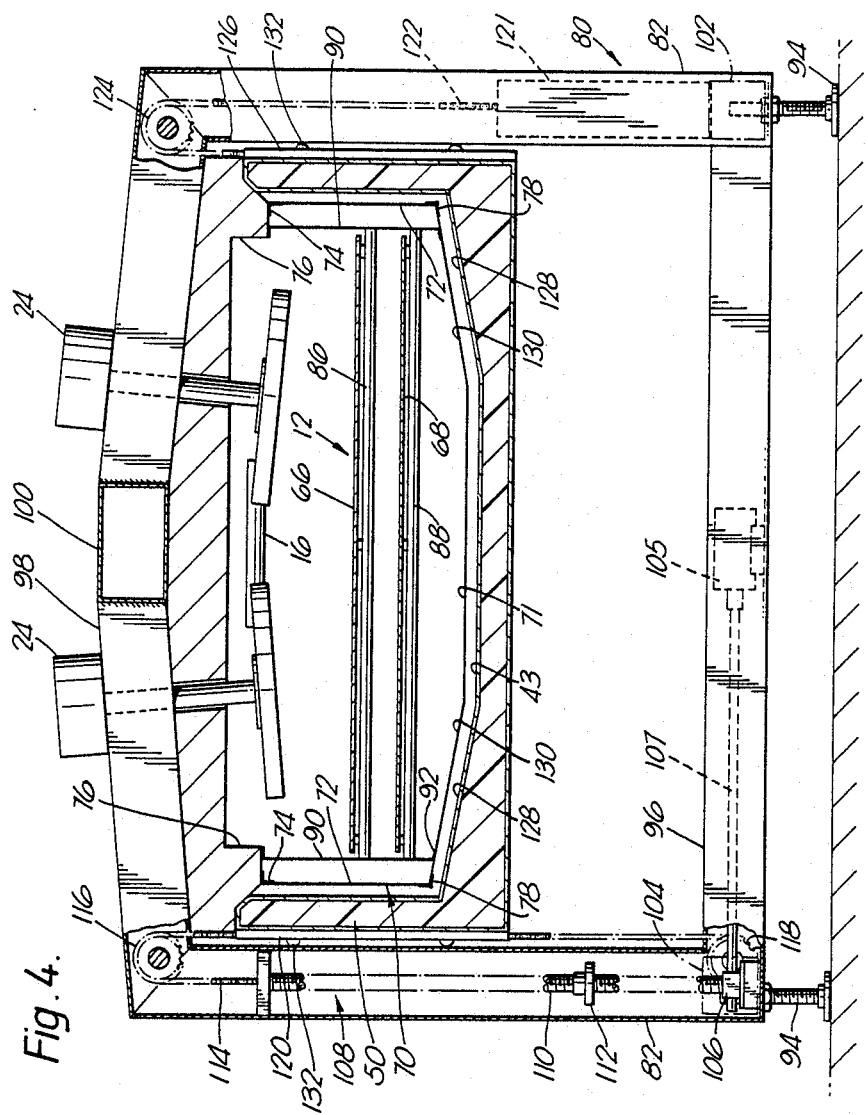
FIG. 4 is a schematic section through the line IV—IV in FIG. 2.

In order to maintain high standards of hygiene, it is desirable that the tunnel be easy to clean, for example by flushing with steam, after it has been used and allowed to return to ambient temperature. As shown in FIGS. 2 to 4, the tunnel housing 11 comprises a fixed elongate roof member 40 and a lower complementary elongate trough member 42 which is able to be displaced from an upper position (as shown in FIGS. 2 and 4) in which it engages the roof member 40, this position being the one that the trough member 42 has in normal use of the tunnel 10 to freeze food products, to a lower position (as shown in FIG. 3) in which the trough member 42 is apart from the roof member 40, this position being the one that the trough member 42 has when the tunnel is to be cleaned. The means provided for raising and lowering the trough member 42 will be described below.

The trough member 42 comprises (as shown in FIG. 5) an inner skin 44, an outer skin 46, and thermal insulation 48 such as expanded polyurethane foam filling the space between the inner and outer skins 44 and 46 respectively. Typically, the skins 44 and 46 may comprise relatively thin gauge stainless steel sheet.

As shown in FIGS. 2, 4 and 6, the trough member 42 has generally vertical elongate sides 50. With reference to FIG. 6, each side 50 has a top face 52 sharing a common edge 56 (see FIG. 6) with a sloping internal face 54 that slopes downwards a short distance from the edge 56 to an edge 58 (see FIG. 6) of a generally vertical surface 60. The faces 52 and 54 when the trough member 42 is in its upper position engage complementary faces 62 and 64, respectively, of the roof member 40. The engagement is not gas-tight but any leakage of gas from the interior of the tunnel 10 between the engaging faces to the exterior of the tunnel 10 is minimal in its operation to freeze food products.

Thus, preferably, no elastomeric or like sealing member is engaged between the faces 52 and 54 on the one hand and the complementary faces 62 and 64 on the other hand, although, if desired, such a sealing member may be employed. If desired, however, electrically heated tapes (not shown) may be disposed at chosen locations along but within the faces 52 and 54 so as to be effective to prevent the accumulation of ice on the external surfaces. Excessive quantities of such ice tend to cause the trough member 42 to stick to the roof member 40 sufficiently firmly for lowering of the trough member 42 to be prevented or hindered and thus with such quantities of ice present, it may be necessary to wait an undesirably long period of time after a food freezing operation has been ended before lowering the trough member to gain access to the interior of the tunnel. However, with the use of the electrically heated tapes, ice formation may be prevented. Moreover, as will be explained below, the tunnel is constructed so as to impede the flow of liquid nitrogen or its cold vapour towards the engaging faces of the roof member 40 and the trough member 42 and thereby limit the rate of formation of ice between the engaging members and thereby limit the rate of formation of ice between the engaging members.

Referring again to FIG. 4, it can be seen that the engaging surfaces of the roof member 40 and trough member 42 are at a level above the upper run 66 of the conveyor belt 12. These surfaces are thus in a position such that spray from the overhead spray-header 16 is directed away from them. There is thus substantially no risk of direct impingement of the liquid nitrogen on these engaging surfaces in operation of the tunnel 10. Moreover, as shown in FIGS. 2 to 4 and FIG. 6, the trough section 42 is provided with a complementary inner trough or sleeve 70 (or 'liner' as we sometimes also call it) which extends from near the entrance and of the tunnel 10 to near the exit end thereof.

As shown in FIG. 2, the sleeve is located between the inner surface of the trough member 42 and the lower run 68 of the conveyor belt 12. (For ease of illustration the belt 12 is omitted from FIG. 6.) In consequence, the sleeve 70 is not able to extend for the whole length of the tunnel 10, its extent at the exit end being limited by the catenary of the belt. The flow regime is arranged so as to keep down the flow of cold nitrogen out of the end of the sleeve 70 near the exit end 15 of the tunnel, but such cold nitrogen that does follow such a path will be withdrawn by the exhaust blower 21 as the plenum 17 communicates with the space defined between the sleeve 70 and the trough member 42. Moreover, at the entrance end 14 of the tunnel, the interior of the sleeve 70 exhausts into the plenum 17.

The sleeve 70 has sides 72 spaced from and complementary to the sides 50 of the trough member 42. At the top of each side 72, the sleeve 70 is demountably attached to a resilient or springy elongate, L-shaped rail 74 which is fixed to a complementary downward projection or lug 76 from the roof member 40. The sides of the sleeve 70 preferably make a substantially gas tight seal with the respective rails 74 such that in operation of the tunnel the flow of cold gas from within the sleeve 70 through the seals between the tops of the sides 72 and the rails 74 is substantially prevented and thus the main route for passage or infiltration of cold gas from within the sleeve 70 to the space between the sleeve 70 and the inner surfaces of the trough member 42 is along the interior of the sleeve and out through its ends. The sleeve 70 thus acts as a considerable barrier to the flow of cold gas from the vicinity of the spray-header 16 to the inner surfaces of the trough member 42. We believe that a number of practical advantages accrue from the presence of the sleeve 70. First, the tendency for ice to form at the engaging surfaces of the roof member 40 and the trough member 42 is reduced. Second, it is typically possible to cool down the tunnel from ambient temperature to a chosen operating temperature below 0° C. more rapidly than in conventional tunnels. Third, more efficient utilisation of the cold of the liquid nitrogen is made possible, partly because liquid nitrogen cannot spray directly onto the trough member. Fourth, food debris is retained by the inner trough where it can be easily removed. Fifth, it is not necessary to have a sealing engagement between the trough member and the roof member. Moreover, the sealing engagement between each side 72 and complementary rail is applied horizontally and is relatively low thus reducing the force required to close the tunnel.

As shown in FIG. 6, the sides 72 of liner or sleeve 70 are hinged in the longitudinal direction at 78. This construction enables access to be gained at the innermost parts of the tunnel once the trough member 42 has been lowered. Once the trough member 42 has been lowered, the sides 72 of the sleeve 70 may be detached from the rails 74. (For example, latches (not shown) may be employed to attach the sides 72 of the sleeve 70 to the rails 74.) The sides 72 may then be lowered from their vertical position as shown in FIGS. 2, 4 and 6 to the generally horizontal position shown in FIG. 3.

The tunnel 10 has a frame 80 with legs 82 that serves to support the weight of the tunnel. As shown in FIG. 3, those parts 84 of the sides 72 of the sleeve 70 that are adjacent the legs 82 are not hinged. Preferably, the hinged sections of the sides 72 when in their upright portions engages the respective fixed parts 84 in a substantially gas tight manner so as to minimize the flow of gas therebetween.

Referring again to FIG. 6, there are shown one pair of conveyor belt support rods 86 and 88. The rod 86 is adapted to support the upper belt run (not shown in FIG. 6) and the rod 88 to support the lower belt run (not shown in FIG. 6). The rods 86 and 88 extend between a pair of hangers 90 (only one of which is shown in FIG. 6) which are fixed to the respective projections 76 on either side of the longitudinal axis of the tunnel 10. Thus, when the trough member 42 is lowered the conveyor 12 remains in the same position.

The hangers 90 are also employed to support the sleeve 70. Each hanger 90 has an inclined inwardly-extending flange 92 to which a complementary face of the sleeve 70 is bolted or otherwise secured. The sleeve 70 is thus independent of the trough member 42 and thus remains in the position shown in, for example, FIG. 6 when the trough member 42 is lowered.

The means for raising and lowering the trough member 42 of the tunnel 10 will be described below and form the subject of our copending U.S. patent application Ser. No. 07/047,959, filed May 7, 1987, entitled "Food Freezing Tunnel". This means is largely incorporated into the support frame 80 for the tunnel 10 and thus relatively unrestricted downward travel of the trough member 42 is made possible. As shown in FIGS. 2 to 4 the frame comprises a plurality of pairs of opposed legs 82. The legs 82 are mounted on adjustable feet 94. Each pair of opposed legs 82 is connected by a lower cross-beam 96 and are welded or otherwise secured to upper cross-members 98 which in turn are welded or otherwise secured to the respective sides of a longitudinal beam 100. The roof member 40 is secured to the cross-members 98. All the legs 82 on one side of the tunnel 10 have a longitudinal strengthening member 102 extending therethrough and an analogous strengthening member 104 is provided for the legs on the other side of the tunnel. The legs 82, cross-beams 96, cross-members 98 and longitudinal beam 100 are all typically hollow. There is preferably one pair of legs 82 and associated cross-beam 96 and cross-members 98 at or near one end of the tunnel, and another pair of legs 82 and associated cross-beam 96 and cross-members 98 at or near the other end of the tunnel. Typically, the longitudinal spacing between adjacent legs of the tunnel is in order of 10 ft. Thus a freezing tunnel that is 20 ft long will have three pairs of legs 82, a tunnel that is 30 ft long will have four pairs of legs 82, and a tunnel that is 40 ft long will have five pairs of legs 82, and so on. (It should be noted that in FIG. 1 many of the structural elements of the frame are omitted for purposes of clarity of illustration.)

In the event that there is an odd number of pairs of opposed legs 82, each of the central pair of legs 82 houses in its hollow interior mechanical means effective to raise and lower the trough section 42 and the rest of the legs carry counterweights to facilitate the raising and lowering of the trough section 42. In the event that there is an even number of pairs of opposed legs 82, the legs of one of the two more central pairs each houses in its hollow interior mechanical means effective to raise and lower the trough section 42 and the rest of the legs carry counterweights to facilitate the raising and the lowering of the trough section 42.

Referring now to FIG. 4 of the drawings, a cross-beam 96 houses an electric (DC) motor 105 which drives a pair of horizontal shafts 107 extending out of opposite ends of the motor housing. (Only one shaft is shown in FIG. 4.) Each shaft 104 at its end remote from the motor 102 extends into and ends in the interior of a leg 82 joined to the cross-beam 96 having the motor 105 and shaft 107. The end of each shaft carries a suitable worm wheel (not shown) which co-operates with a complementary pinion 106 mounted on the vertical screw-threaded shaft 110 of jack means 108 housed in the respective leg 82. Each shaft 110 carries a complementary screw-threaded nut 112 to which is secured one link of a chain 114 that extends around upper and lower pulley wheels 116 and 118 housed within the frame 80. Another part of the chain is secured to a flange 120 extending outwards from the trough member 42. The arrangement is that the part of the chain 114 that is secured to the trough member 42 is on the opposite side of the pulley wheel 116 and 118 to the link that is secured to the nut 112. Thus, by operation of the motor 105, the trough member 42 may be jacked up and down. The motor 105 rotates the shaft 107 which in turn rotates the screw-threaded shaft 110, thereby causing the screw-threaded nuts 112 to travel up or down the shafts 110 according to the direction of rotation of the shafts 110. Travel of each nut 112 up its shaft 110 pulls the chain 114 in a clockwise direction, thereby lowering the trough section 42. By reversing the direction of rotation of the motor 105, each nut 112 may be caused to travel down the shaft 110 thereby raising the trough member 42 into engagement with the roof member 40. Limit switches (not shown) may be employed to deactivate the electric motor 105 when the trough section reaches its topmost and bottommost positions. It is not essential to employ an electric motor to drive the screw-threaded shafts 110. For example, a manual drive through a suitable gear box could be alternatively employed. It is, however, desirable to employ a single drive means for the jacks 108 to ensure that they are raised and lowered in unison.

Those legs 82 of the frame 80 that do not house a screw-threaded shaft 110, house counterweights instead. Each counterweight comprises a hollow container 121 which is able to be filled with lead shot or other kind of weights. (The counterweights may alternatively each comprise a support rod onto which weights can be loaded.) The upper end of the container 121 is secured to one end of a length of chain 122 which extends over a pulley wheel 124 located within the frame 80 and which at its other end is secured to a flange 126 projecting from the side of the trough member 42. Accordingly, the counterweights oppose any tendency for the ends of the trough member to fall, when being lowered, at a greater speed than the centre of the tunnel, that is they resist any tendency for the trough member to buckle or bow during lowering. Similiarly, when the trough section 42 is raised again, the weight of the counterweights tends to assist the upward travel of the trough member 42, thus keeping down the amount of power that the motor 102 needs to apply in order to raise the trough member 42, thereby adding to the safety of the tunnel.

Since the trough member 42 has a centre of gravity that lies on an axis remote from the axes of the wormed shafts 110, during periods in which the electric motor 103 is not operated each nut 112 will naturally be locked in position in its shaft 110, and accordingly the trough member will be held firm. Moreover, when the trough member 42 is in its upper position, the counterweights apply a basis to the trough member which helps to maintain a fluid-tight seal between it and the roof member 40.

If desired, in order to facilitate cleaning of the tunnel, it may be arranged that the floor of the trough section 42 slopes from entance to exit, or vice versa, at a small angle to the horizontal, say, a half a degree or one degree. Additionally, the floor 43 of the trough section 42 and the floor 71 of the sleeve 70 may be provided with inclined surfaces 128 and 130, respectively, that slope downwards from the sides 50 and 72, respectively, towards the longitudinal axis of the floor of the trough section 42.

The tunnel may also be provided with guides 132 on its legs 82 so as to guide the upwards and downwards travel of the trough member 42.

Various changes and modifications may be made to the tunnel shown in FIGS. 1 to 6.

For example, referring to FIG. 7, it is possible for the floor 71 of the sleeve 70 to be located between the upper and lower runs of the conveyor belt rather than underneath the lower belt run as shown in FIGS. 2 to 4 and 6. Accordingly, the hanger 90 are each formed in two pieces 140 and 142. The piece 140 carries one end on upper conveyor belt support rod 86 and the piece 142 carries the corresponding end of a lower conveyor belt support rod 88. The pieces 140 and 142 have complementary flanges 144 and 146 respectively, between which the sleeve 70 extends. The flanges 144 and 146 are bolted together and thus both rods 86 and 88 and the sleeve 70 are secured to the roof member 40 (not shown in FIG. 7). One advantage of this arrangement is that the extent of the sleeve is no longer limited by the belt catenary and thus the sleeve 72 can extend substantially from the entrance to the exit end of the tunnel. One advantage of such a construction is that it effectively reduces the volume of the tunnel that is available to the cold nitrogen vapour and aid recirculation of cold vapour within the inner sleeve. Thus, good utilisation of the refrigeration available from the liquid nitrogen is facilitated.

Figure 8:
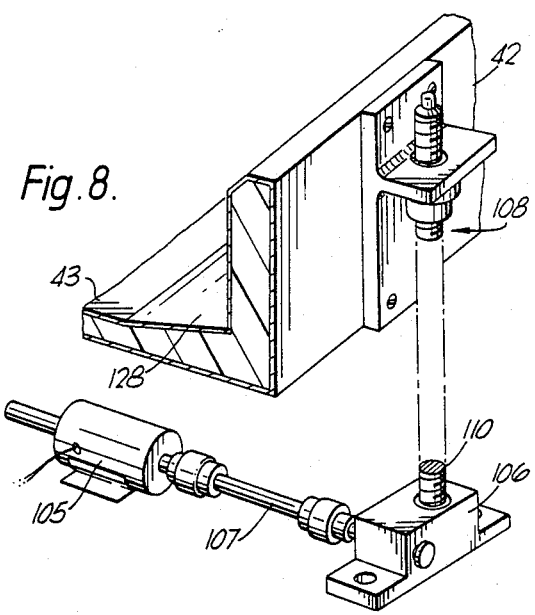
FIG. 8 is a schematic perspective view of a detail of a further alternative embodiment of tunnel to that shown in FIGS. 1 to 6.

It is also possible to connect the nut 112 of each jack means 108 directly to the trough member 42 rather than employing the intermediate means of a pulley-and-chain (as shown in FIG. 4). An arrangement in which a nut 112 is connected directly to the trough member is shown in FIG. 8, from which the frame 80 has been omitted for purposes of clarity of illustration.

Figure 9:
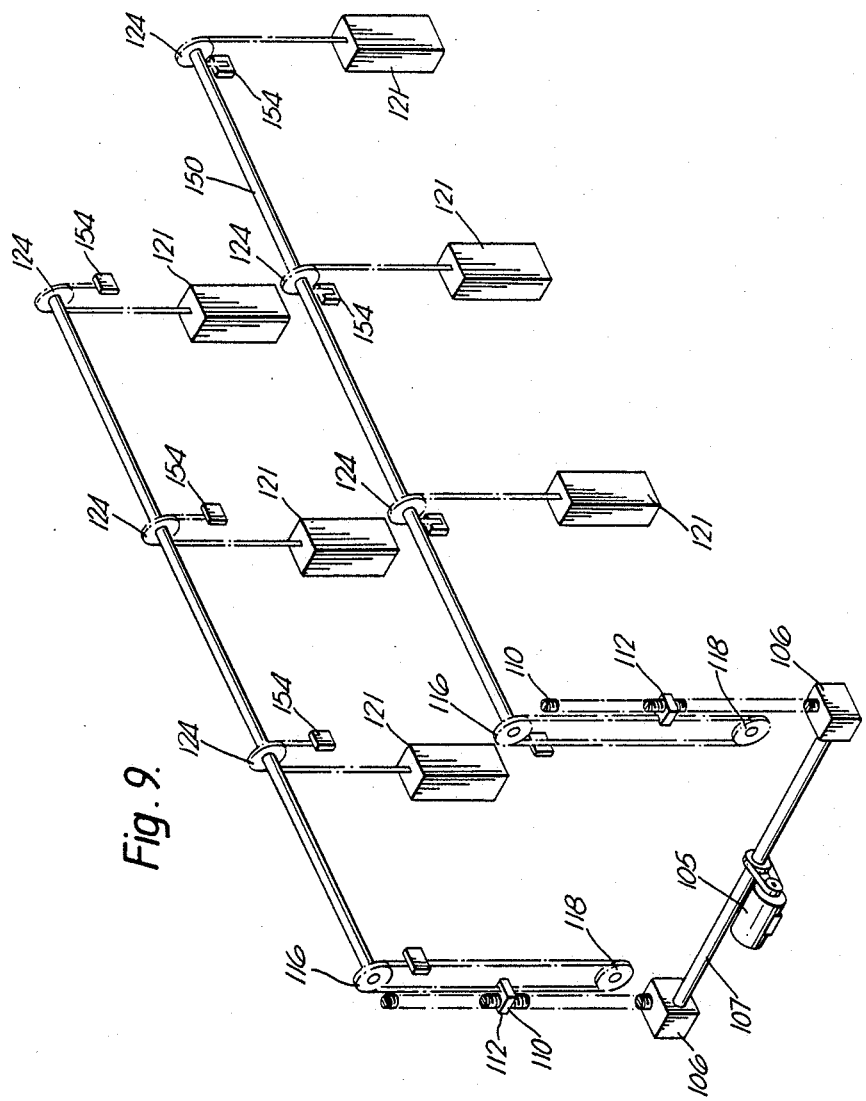
FIG. 9 is a schematic perspective view of the tunnel raising and lowering mechanism of another alternative embodiment of tunnel to that shown in FIGS. 1 to 6.

In a further and preferred modification, shown in FIG. 9 which illustrates the lifting mechanism for the trough, with the trough, roof member, and the supporting framework of the tunnel all not shown, for the sake of clarity of illustration, there are two longitudinal shafts 150 extending parallel to one another. One shaft 150 supports those of the pulleys 116 and 124 on one side of the tunnel, while the other shaft 150 supports the remaining pulleys 116 and 124 on the other side of the tunnel.

Thus, by mechanically linking the counterweight supports, the driven screw-threaded shafts 110 can be located at any pair of tunnel legs. The most convenient pair of legs for such location of the drive mechanism is at the (food) exit end of the tunnel where owing to the slope of the trough the clearance between the trough in its lowered position and the floor is the greatest, thus facilitating accommodation of motor 105. Moreover, the shafts 124 ensure synchronisation of the movement of the counterweights 121 and prevent any tendency for the trough to slew. The pulleys 116, 118 and 124 are typically formed as sprockets. The shafts 150 are preferably accommodated in longitudinal hollow beams (not shown) similar to the beams 102. There is a single drive shaft 107 with a chain drive from motor 105 which runs off alternating current 107. Plates or blocks 154 are provided to attach the counterweights 121 to the trough (not shown in FIG. 9).

Figure 10:
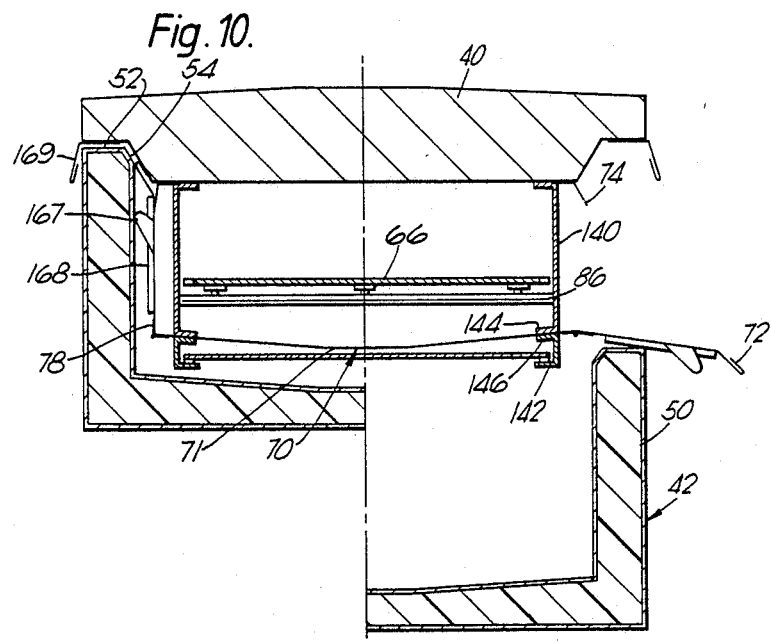
FIG. 10 is a schematic sectional elevation of the trough and roof of a further alternative embodiment of tunnel, part of the trough being shown in its raised position and part in its lowered position.

In FIG. 10 there is shown an embodiment of the tunnel in which the inner trough 70 passes between belt runs in the manner shown in FIG. 7. Referring to FIG. 10, the hinged sides 72 of the trough are provided with projecting members 167 which bear against the respective walls 50 of the trough 42. Accordingly, there is a positive pressure exerted by the sides 72 on the abutting arm of the rail 74 when the tunnel is in its upper position, thereby providing a substantially gas tight seal between each hinged side 72 and its adjacent rail 74. An advantage of this arrangement is that as the tunnel is cooled down in operation, differential contraction of the inner and outer skins of the trough member which tends to reduce the gap between the walls 50 and the side 72, increases the pressure in the members 167, thus improving the gas sealing. Typically, when the trough 42 is in its upper, or operating, position there is no direct contact between the roof member 40 and the trough member 42 and in particular there is a clearance between the faces 52 and 54 of the trough member 42 and the complementary faces of the roof member 40.

Engagement of the roof member 40 at the tunnel with the trough member 42 is through the rails 74 and the sides 72 of the inner trough 70. The seals so defined are sufficient to minimise leakage of cold gas from the tunnel to the ambient environment. Preferably, as shown, the downwardly depending arm of each rail 74 slopes from top to bottom toward the adjacent side 50 of the trough member 42 so as to facilitate its engagement with the adjacent side 72 of the trough 70. Cover strips 169 are provided on the roof edges to minimise air flow into the space between the roof 40 and the inner trough 70. The cover strips may be flexible and if desired contain an elastomeric seal.

When the trough member 42 is lowered (see the right hand side of FIG. 10) the sides 72 of the inner trough 70 fall under gravity. When the trough 40 is raised again the trough carried the sides upwards until at the end the upward travel of the trough 42 the sides 72 reassume their upright positions in which they bear against the respective rails 74. The region of each side 72 that rests on the trough 42 in its lowermost position has a wear-resistant strip 168 applied thereto.

What is claimed is:

1. Apparatus suitable for freezing food, comprising a tunnel defined by an outer trough member and a roof member; a conveyor extended through the tunnel from its entrance to its exit and having an upper run and a lower run; means for introducing liquefied gas into the tunnel; means for creating in the tunnel turbulence in cold gas formed as a result of vaporisation of the liquefied gas; and an inner trough member spaced from the outer trough, having a floor extending underneath the upper run of the conveyor and having sides which prevent direct impingement of liquefied gas onto the outer trough and which co-operate with said roof member to inhibit the passage of cold gas from within said inner trough member over said sides.

2. Apparatus as claimed in claim 1, in which the sides engage the roof or complementary projections therefrom.

3. Apparatus as claimed in claim 2, in which the roof member has a pair of elongated downward projections or lugs, each of which engages one face of a resilient stainless steel sealing member, another face of said sealing member being engaged by the inner trough member, whereby a fluid-tight seal is formed between the inner trough member and the roof member.

4. Apparatus as claimed in claim 1, in which there is no direct contact with the outer trough member and longitudinal sealing members depending internally from the roof member, said outer trough member being adapted to bias the sides of the inner trough into contact with the sealing members.

5. Apparatus as claimed in claim 1, in which the outer trough member is vertically reciprocable between an upper operating position and a lower position in which access is able to be gained to the interior of the tunnel through the sides thereof.

6. Apparatus as claimed in claim 5, in which some parts of each side of the inner trough are hinged, whereby when the outer trough is in its lower position said parts are able to be lowered to permit access to be gained to the interior of the inner trough.

7. Apparatus as claimed in claim 6 in which the sides engage the roof or complementary projections therefrom.

8. Apparatus as claimed in claim 7 in which there is no direct contact between the outer trough member and longitudinal sealing members depending internally from the roof member, said outer trough member being adapted to bias the side of the inner trough into contact with the sealing members.

9. Apparatus as claimed in claim 8 wherein the means for introducing liquefied gas includes a spray header located above the upper run of the conveyor and the sides extend above the upper run of the conveyor.

10. Apparatus as claimed in claim 1, in which the inner trough extends from a region at or near the entrance to the tunnel to a region at or near the exit from the tunnel.

11. Apparatus as claimed in claim 1, in which the floor of the inner trough extends between the upper and lower conveyor runs.

12. Apparatus as claimed in claim 1, in which the floor of the inner trough extends underneath the lower conveyor run.

13. Apparatus as claimed in claim 1 wherein the means for introducing liquefied gas includes a spray header located above the upper run of the conveyor and the sides extend above the upper run of the conveyor.

* * * * *